United States Patent [19]

Sluzky et al.

[11] Patent Number: 5,202,777
[45] Date of Patent: Apr. 13, 1993

[54] LIQUID CRYSTAL LIGHT VALUE IN COMBINATION WITH CATHODE RAY TUBE CONTAINING A FAR-RED EMITTING PHOSPHOR

[75] Inventors: Esther Sluzky, Encinitas; Mary A. Lemoine, Oceanside; Kenneth R. Hesse, Escondido, all of Calif.

[73] Assignee: Hughes Aircraft Company, Los Angeles, Calif.

[21] Appl. No.: 861,680

[22] Filed: Apr. 1, 1992

Related U.S. Application Data

[62] Division of Ser. No. 708,552, May 31, 1991, abandoned.

[51] Int. Cl.$^5$ .................... G02F 1/1335; G02F 1/135
[52] U.S. Cl. ................... 359/50; 252/301.4 R; 313/468; 340/794; 340/795; 359/72
[58] Field of Search ............ 252/301.4 R; 313/468; 340/794, 795; 359/50, 72

[56] References Cited

U.S. PATENT DOCUMENTS 4,315,832 2/1982 Pastor et al. ................ 252/301.4 R

FOREIGN PATENT DOCUMENTS

| 3902001 | 7/1990 | Fed. Rep. of Germany ... 252/301.4 R |
| 46-43521 | 12/1971 | Japan ............................ 252/301.4 R |
| 49-106486 | 10/1974 | Japan ............................ 252/301.4 R |
| 56-125479 | 10/1981 | Japan ............................ 252/301.4 R |
| 2000173 | 1/1979 | United Kingdom ......... 252/301.4 R |

OTHER PUBLICATIONS

Burns et al., "Physical Review", vol. 139, No. 5A, pp. 1687–1693 (1965).
Wood et al., "J. of Chem. Phys.", vol. 39, No. 4, pp. 890–898 (1963).
Sevast'yanov et al., "Chem. Abstr.", vol. 78, 1973, 166,773q.
Nippon "Chem. Abstr.", vol. 94, 1981, 217,409R.

*Primary Examiner*—Jack Cooper
*Attorney, Agent, or Firm*—Terje Gudmestad; Jeannette M. Walder; W. K. Denson-Low

[57] ABSTRACT

A far-red emitting phosphor for cathode ray tubes used in liquid crystal light valves comprises $Y_{3-y}Gd_yAl_{5-x}Ga_xO_{12}$:A, where x ranges from 0 to 5, y ranges from 0 to 3, and A is selected from the group consisting of chromium, iron, vanadium, neodymium, dysprosium, cobalt, nickel, titanium or combination thereof.

5 Claims, 7 Drawing Sheets

LIQUID CRYSTAL LIGHT VALUE IN COMBINATION WITH CATHODE RAY TUBE CONTAINING A FAR-RED EMITTING PHOSPHOR

BACKGROUND OF THE INVENTION

1. Field of the Invention

The present invention relates to phosphors used in cathode ray tubes (CRTs) for liquid crystal displays, and, more particularly, to a new family of phosphors having the yttrium aluminum garnet crystal structure.

2. Description of Related Art

Phosphors used for addressing the amorphous-silicon in the Hughes liquid crystal light valve (LCLV) must meet the following conditions:

Spectral output as closely matched to the amorphous silicon ($\alpha$-Si) response as possible;

Maximum radiant energy output in the spectral range of interest;

Decay time less than approximately 10 milliseconds measured from 100% to 10% levels;

Average particle size suitable for high resolution operation - less than about 6 $\mu$m; and High resistance to either thermal or life-induced degradation.

The spectral responsivity of $\alpha$-silicon used in the LCLV peaks at about 740 nm. Consequently, for optimum sensitivity, the incoming light which is used to activate the $\alpha$-silicon photosensitive layer should provide as close a match to the responsivity curve as possible.

Many phosphors have been investigated in an attempt to find a phosphor having the correct characteristics in regard to spectral emission, decay time, efficiency, and small particle size. Such phosphors include aluminum oxide:Cr, cadmium sulfide:Ag, zinc cadmium sulfide:Ag, zinc phosphate:Mn, yttrium oxysulfide:Eu, yttrium aluminum oxide:Eu, etc.

One existing far-red phosphor (by "far-red" is meant about 600 to 800 nm) used in luminescent lamps demonstrated a very close match to the $\alpha$-silicon responsivity. It consists of a lithium aluminum oxide activated with iron ($LiAlO_2$:Fe). In the commercially available material, the iron concentration is about 0.5%. However, this phosphor, when used in CRTs, has a much longer decay time than can be tolerated, approximately 30 milliseconds.

Yttrium aluminum garnet (YAG) phosphors are well-known in the art. They have various activators such as terbium, cerium, europium, etc. In YAG:Eu, the energy is distributed between the 591, 608, 630, and 710 nm lines, with lesser peaks at about 649 and 692 nm. Because of this spectral output, this phosphor does not efficiently turn on the light valve.

No commercially available phosphors were found to satisfy the $\alpha$-silicon LCLV requirements.

SUMMARY OF THE INVENTION

In accordance with the invention, a new family of phosphors is provided, having the yttrium aluminum garnet crystal structure. The generalized formula for the phosphor of the invention is given by $Y_{3-y}Gd_yAl_{5-x}Ga_x-O_{12}$:A, where x ranges from 0 to 5, y ranges from 0 to 3, and A is selected from the group consisting of chromium, iron, vanadium, neodymium, dysprosium, cobalt, nickel, titanium or combination thereof.

Phosphors with the formula given above display customized variations in their spectral output, radiance, and persistence characteristics within the requirements dictated by the needs of $\alpha$-silicon photosensitive layers in liquid crystal light valves.

DESCRIPTION OF THE PREFERRED EMBODIMENTS

Figure 1:
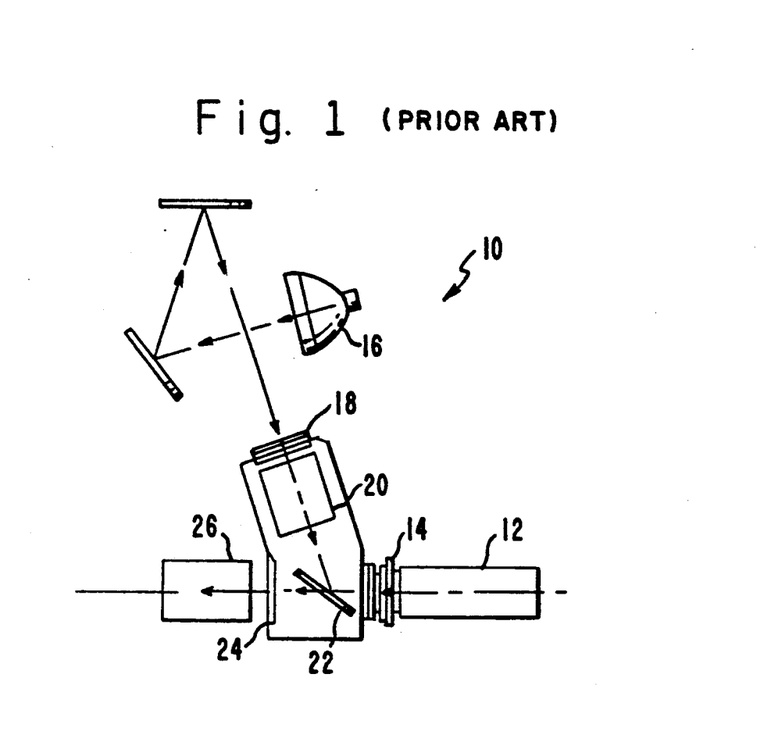
FIG. 1 is a schematic diagram of a liquid crystal light valve projector system, employing a cathode ray tube.

A liquid crystal light valve (LCLV) is described in, for example, SID International Symposium, Digest of Technical Papers, "Video-Rate Liquid Crystal Light-Valve Using an Amorphous Silicon Photoconductor", R. D. Sterling et al, Vol. XXI, pp. 327-328 (1990). FIG. 1, which is taken from that reference, is a schematic diagram of a basic LCLV projector 10, comprising a cathode ray tube (CRT) 12, which provides an input image which is coupled to a liquid crystal light valve 14, typically through a fused fiber optic faceplate (not shown). A xenon arc lamp 16 provides the output light, which is filtered by UV filter 18 and linearly polarized by pre-polarizer filter 20 before reaching the LCLV 14. The image then passes through a polarizing mirror 22, a prism wedged window 24, and then through a projection lens 26, where it is projected onto a screen (not shown).

The foregoing projector is an example of apparatus employing a combination of the LCLV and CRT. Other combinations of LCLVs and CRTs are also known. While such combinations are known to those skilled in the art, none of the CRTs disclosed uses as a phosphor the phosphor of the invention.

Figure 2:
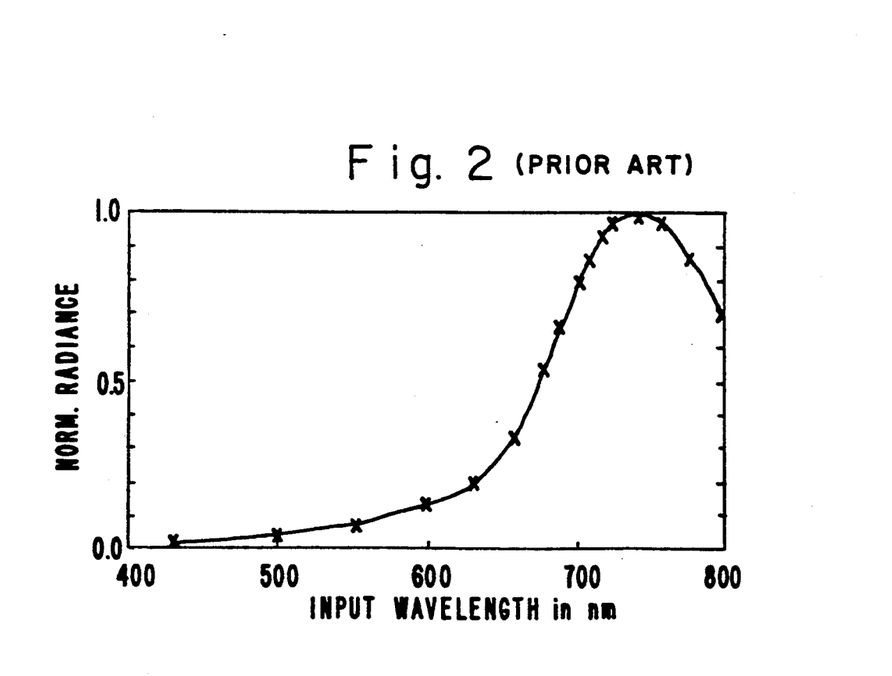
FIG. 2, on coordinates of normalized radiance and wavelength in nanometers, is a plot of the spectral response of an amorphous silicon ($\alpha$-Si) photoconductor.
Figure 3:
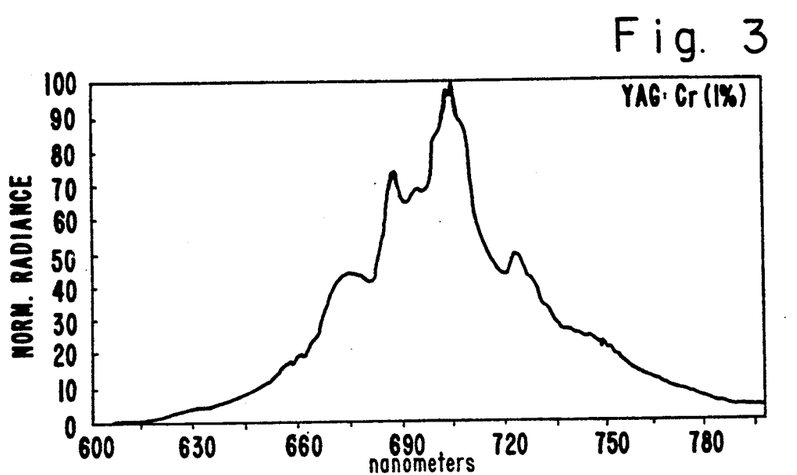
FIGS. 3-10, on coordinates of normalized radiance and wavelength in nanometers, are plots of light output of $Y_{3-y}Gd_yAl_{5-x}Ga_xO_{12}$:Cr as a function of composition, (a) where y=0 and x=0 (FIG. 3), 1 (FIG. 4), 2 (FIG. 5), 3 (FIG. 6), 4 (FIG. 7), and 5 (FIG. 8), (b) where y=3 and x=5 (FIG. 9), and (c) where y=3 and x=0 (FIG. 10)
Figure 4:
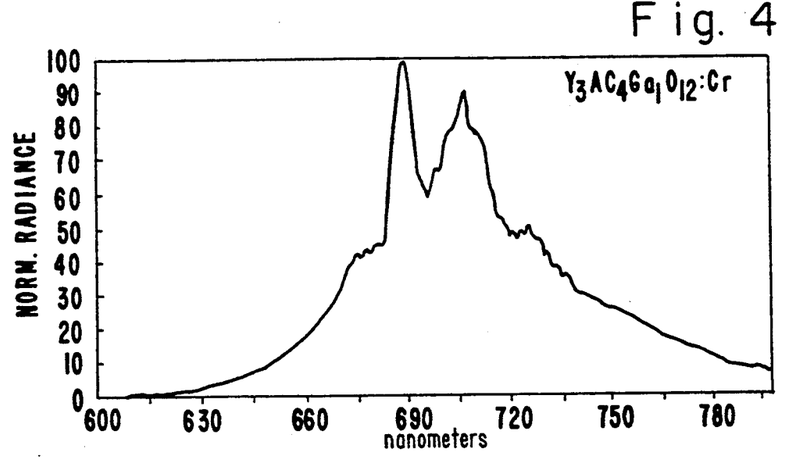
Figure 5:
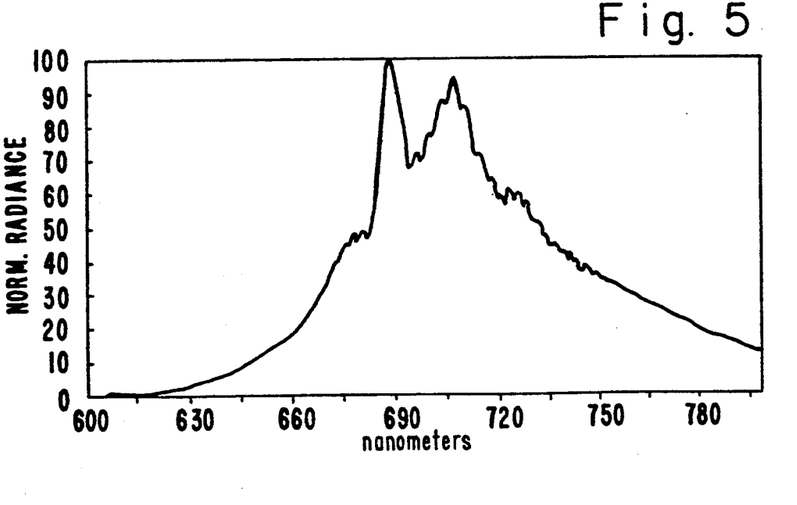
Figure 6:
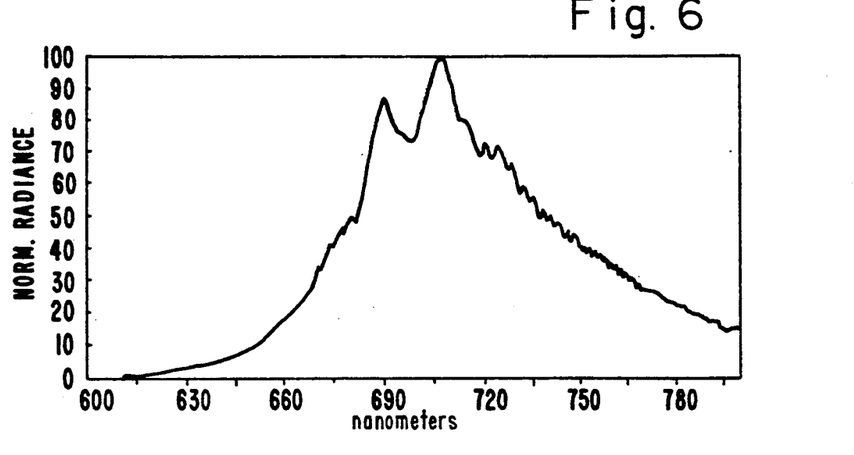
Figure 7:
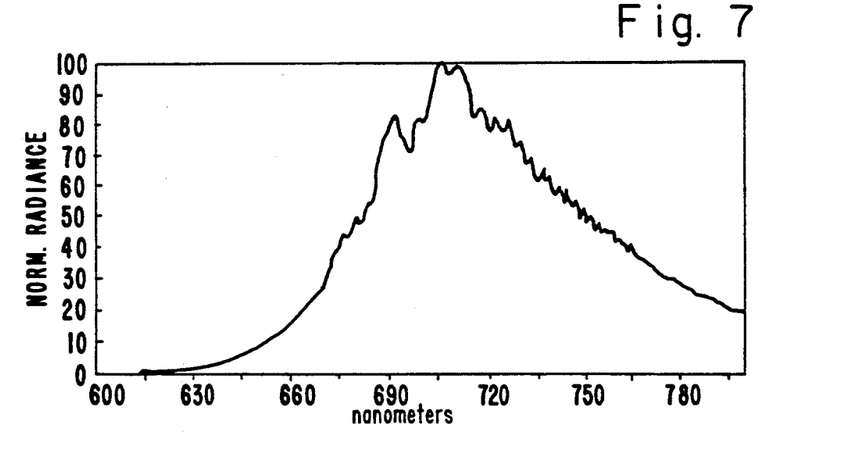
Figure 8:
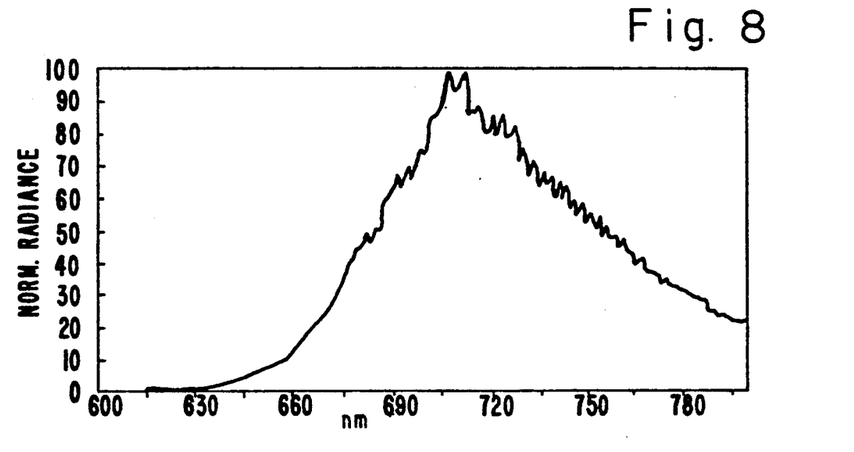
Figure 9:
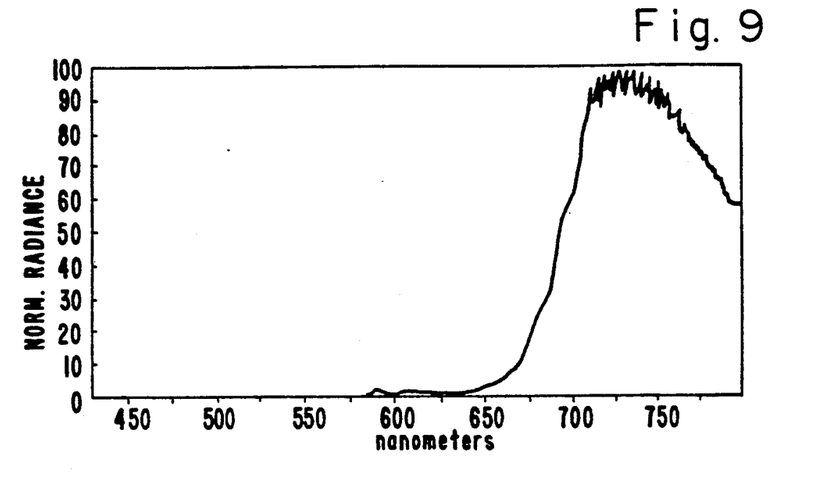
Figure 10:
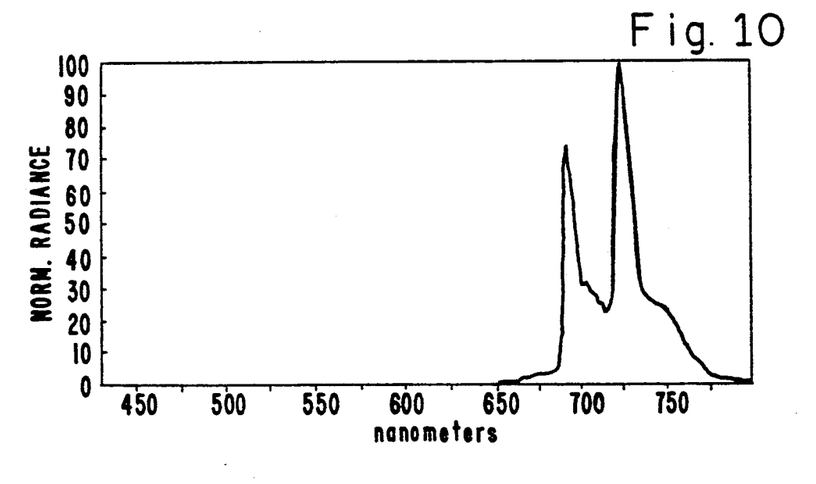
Figure 11:
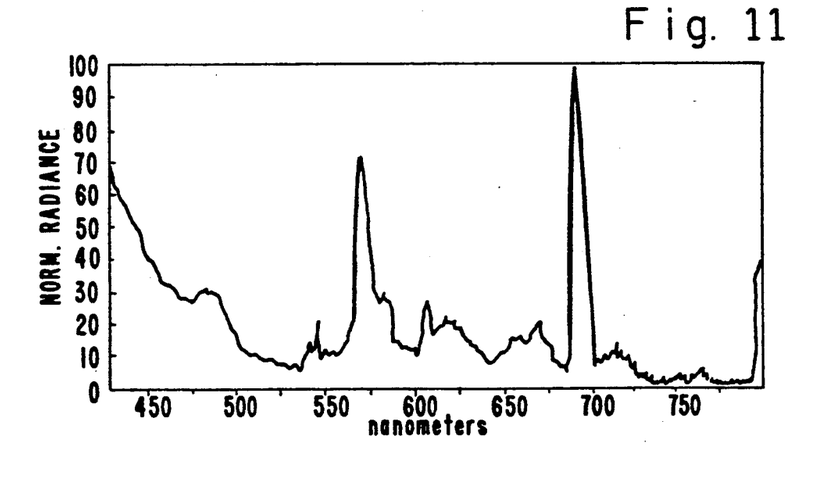
FIGS. 11-15, on coordinates of normalized radiance and wavelength in nanometers, are plots of light output of $Y_{3-y}Gd_yAl_{5-x}Ga_x-O_{12}$:Cr as a function of process condition, where y=0 and x=0 (FIGS. 11-13) and where y=3 and x=5 (FIGS. 14 and 15)
Figure 12:
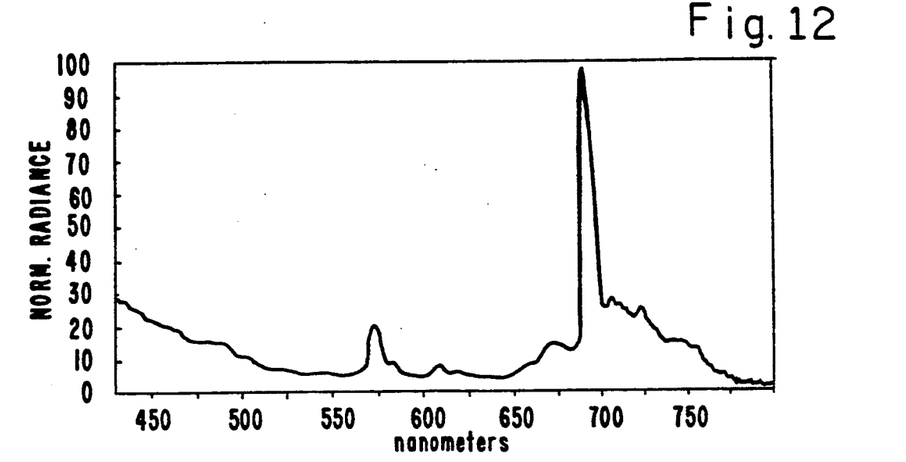
Figure 13:
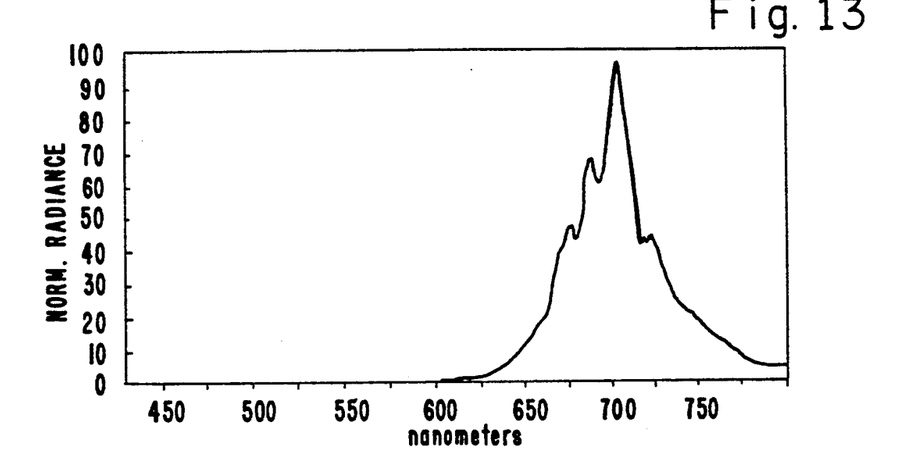
Figure 14:
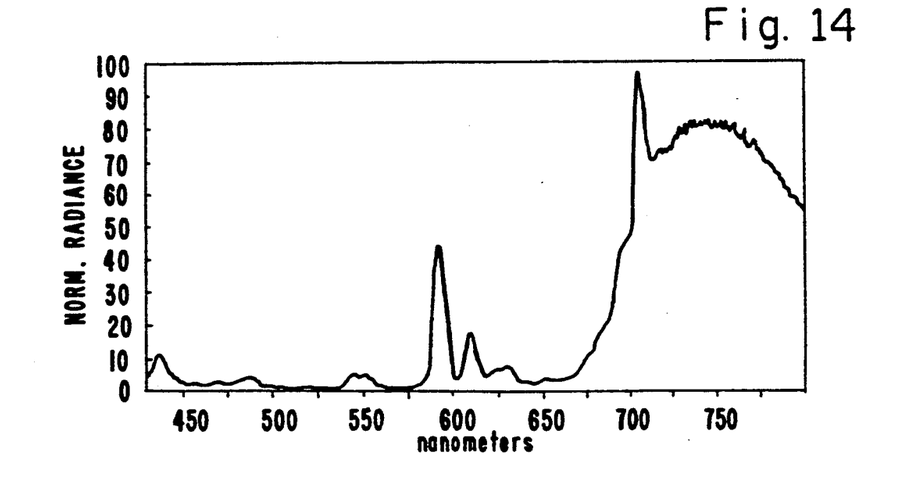
Figure 15:
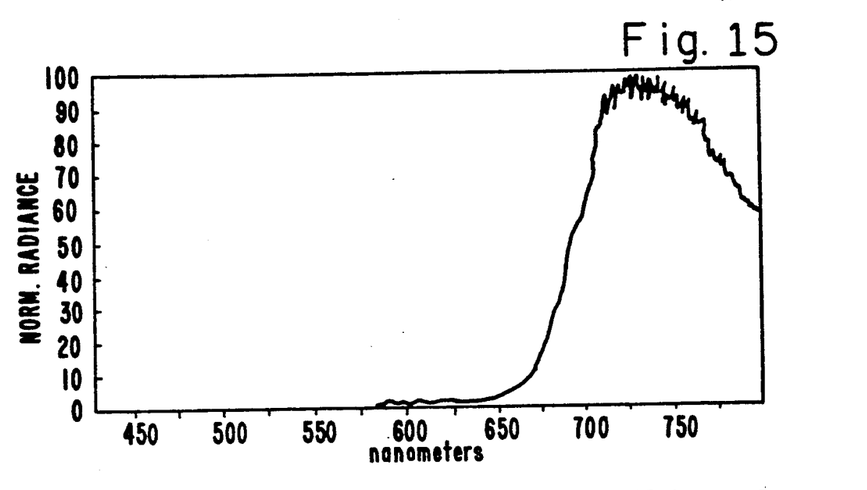

The LCLV employs a hydrogenated amorphous silicon photoconductor ($\alpha$-Si:H), as is well-known and as is shown in the afore-mentioned reference. The spectral response of $\alpha$-Si photoconductor is depicted in FIG. 2. It is this curve to which a phosphor must be as closely matched as possible for efficient energy coupling.

The phosphor composition of the invention is given by the formula $Y_{3-y}Gd_yAl_{5-x}Ga_x-O_{12}$:A, where x ranges from 0 to 5, y ranges from 0 to 3, and A is selected from the group consisting of chromium, iron, vanadium, neodymium, dysprosium, cobalt, nickel, titanium or combination thereof.

Preferably, at least one of chromium, neodymium, and iron is employed. Chromium is most preferably employed, particularly in the range of about 0.33 to 2 at%. Outside this range, the light output is unacceptably reduced.

The preferred compositions depend on the particular desired property. For example, the brightest composition (highest relative output) is achieved with chromium-activated yttrium aluminum garnet, $Y_3Al_5O_{12}$:Cr (YAG:Cr), while the shortest decay time is achieved with chromium-activated gadolinium gallium garnet, $Gd_3Ga_5O_{12}$:Cr (GGG:Cr). The best compromise composition to achieve the maximum brightness and short decay time is $Y_3Al_2Ga_3O_{12}$:Cr. These results are shown below:

| Composition | Rel. Output | Decay |
|---|---|---|
| YAG:Cr | 100 | 5–6 msec |
| GGG:Cr | 45 | 1 msec |
| $Y_3Al_2Ga_3O_{12}$:Cr | 76 | 2 msec. |

The manufacture of the garnet family of phosphors of the invention follows the conventional procedure used in the industry. Starting materials consist of the oxides of the respective elements. These are mixed in stoichiometric proportions and ball milled to produce a well-blended homogeneous mixture. After milling and drying the reactants, they are fired in a one-step process, typically about 1,500° to 1,600° C. for about 2 to 8 hours in an oxidizing atmosphere, such as air.

Alternately, the oxides can be fired in a two-step process, typically about 1,200° C. for 1 to 4 hours, followed by firing at about 1,500° to 1,600° C. for about 2 to 8 hours, again in an oxidizing atmosphere, such as air.

Or, a three-step process may be used, typically employing about 1,200° C. for 1 to 4 hours, about 1,550° C. for about 1 to 4 hours, and about 1,590° C. for about 1 to 4 hours.

These procedures are well-known in the art and thus form no part of this invention.

Since the light emitting properties of the phosphor are improved for small particle size, the firing must accommodate the production of particles having an average particle size of less than about 6 μm.

A sol-gel process can also be employed for producing the phosphor. Starting components in this case consist of either the nitrates or chlorides of Y, Al, and Cr. These are dissolved in deionized water in stoichiometric proportions. The next step is to precipitate the hydroxides of all the metals by adding a solution of ammonium hydroxide in excess to that required for stoichiometry. After suitable digestion and stabilization of the precipitate, it is filtered off, washed thoroughly, and dried. The above firing operations can then be used on this starting material to yield the desired phosphor. Again, such processes are known and do not form a part of this invention.

Alternately, the starting materials can consist of stoichiometric quantities of yttrium, gadolinium, aluminum, and gallium nitrates. These are dissolved in water solution and the hydroxides are precipitated with ammonium hydroxide. After washing, the activator oxide percentage desired can be mixed into the materials by ball milling. After ball milling as above, the mixture is then dried and fired at the same conditions as above. Again, such processes are known and do not form a part of this invention.

Another known alternative is to start with the nitrates of yttrium, aluminum, gadolinium, and gallium and activator and precipitate the hydroxides with ammonium hydroxide as above and processed as above.

A typical method of producing a garnet formulation phosphor according to the teachings of the present invention is now described. This two-step method itself is not considered novel, and forms no part of this invention.

Assuming that it is desired to produce 10 g of phosphor starting with oxide components, the required amount (see the formulations below) of oxides are placed into a two-ounce ball mill with about 30 g of sintered alumina balls having a diameter of approximately 9 mm. Fifteen ml of deionized water is added and the mill is closed and placed on the rollers. Producing greater amounts of the phosphor would require appropriate scale-up, as is wellknown.

After rolling for two hours, during which time the oxides are intimately mixed and their sizes somewhat reduced, the mill is removed from the rolls and the contents dumped into a clean receptacle. Rinse water from the mill is added to the main dump charge. After drying in an oven at approximately 110° C., the powder is sieved through 70 stainless steel mesh. This is placed into a sintered alumina boat and loaded into the furnace at 400° C., The temperature is raised to 1,200° C. and held there for two hours. At the end of this time, the temperature is lowered to 400° C., at which time the boat is removed from the furnace. The furnace atmosphere conveniently is air during the firing operations. The material is sieved again, and the particle size is measured. The material is then placed back in the furnace, and the temperature is raised to 1,600° C. and held there for two hours. The furnace is cooled to 400° C. and the boat removed. This final material is crushed in a mortar with a pestle, sieved, measured for particle size, and is ready for use.

EXAMPLES

A number of compositions were prepared using the procedures outlined above. The effects of several compositions on various characteristics are noted in Table I, below. The relative output is determined by measuring the radiance with a spectoradiometer in the wavelength range of 600 to 800 nm This data is then converted into relative output by dividing each value by the highest radiance value. The decay time is measured in milliseconds. The firing temperature in each case was 1,200° C., followed by 1,600° C. The spectral distribution as a function of composition is shown in the indicated Figures.

TABLE I

| Effect of Composition on Characteristics. | | | | | | | |
|---|---|---|---|---|---|---|---|
| Y | Gd | Al | Ga | Cr at % | Rel. Output | Decay Time, ms | FIG. |
| 2.97 | — | 5 | — | 1 | 100 | 5–6 | 3 |
| 2.97 | — | 4 | 1 | 1 | 49 | 2 | 4 |
| 2.97 | — | 3 | 2 | 1 | 48 | 2 | 5 |
| 2.97 | — | 2 | 3 | 1 | 76 | 2 | 6 |
| 2.97 | — | 1 | 4 | 1 | 71 | 2 | 7 |
| 2.97 | — | — | 5 | 1 | 60 | 2 | 8 |
| — | 2.97 | — | 5 | 1 | 45 | 1–1¼ | 9 |
| — | 2.97 | 5 | — | 1 | 63 | 35 | 10 |
| 1.485 | 1.5 | 2.5 | 2.5 | 1 | 63 | 2 | — |

The effect of firing temperature on characteristics is shown in Table II, below. In all cases, the time of firing was two hours at the indicated temperature. The effect of firing temperature on spectral distribution is shown in the indicated Figures.

TABLE II

Effect of Firing Temperature on Characteristics.

| Y | Gd | Al | Ga | Cr at % | Rel. Output | Firing Temp, °C. | FIG. |
|---|---|---|---|---|---|---|---|
| 2.97 | — | 5 | — | 1 | 18 | 800 | 11 |
| 2.97 | — | 5 | — | 1 | 62 | 800/1200 | 12 |
| 2.97 | — | 5 | — | 1 | 100 | 800/1200/1600 | 13 |
| — | 2.97 | — | 5 | 1 | 35 | 1200 | 14 |
| — | 2.97 | — | 5 | 1 | 64 | 1200/1600 | 15 |

Figure 16:
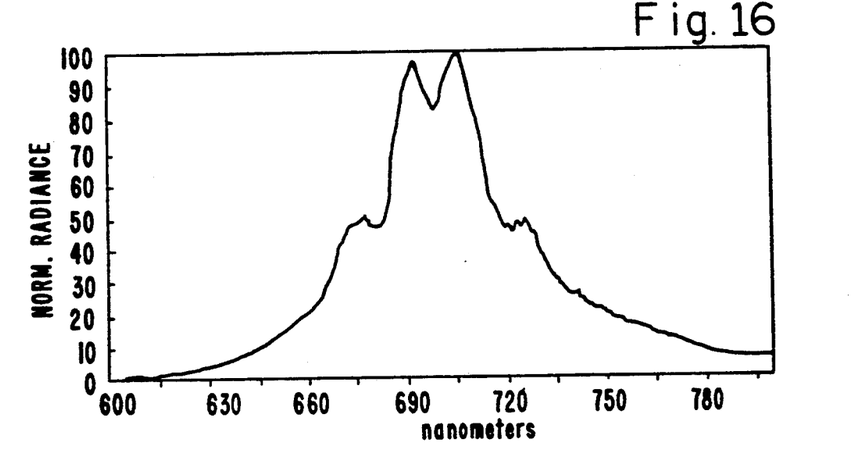
FIGS. 16 and 17, on coordinates of percentile and particle size in micrometers, are plots of the particle size distribution for typical preparations of the phosphors of the invention.
Figure 17:
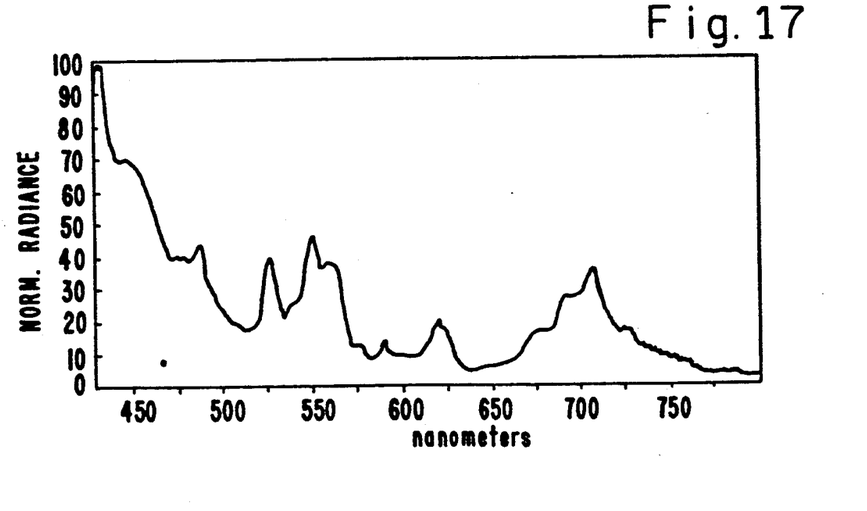

The effect of various additional compositions on relative output is shown in Table III, below. The spectral distribution for two of the compositions is shown in FIGS. 16 and 17.

TABLE III

Effect of Miscellaneous Compositions on Relative Output.

| Composition | Firing Temp, °C. | Rel. Output | FIG. |
|---|---|---|---|
| $Y_{2.97}Al_5O_{12}$:1% Cr | 1600 - 2 hrs | 96 | — |
| $Y_{2.88}Al_5O_{12}$:0.5% Cr | 1600 - 2 hrs | 100 | — |
| $Y_{2.94}Al_5O_{12}$:1% Cr, 1% Nd | 1500 - 4 hrs | 87 | 16 |
| $Y_{2.97}Al_5O_{12}$:1% Nd | 1500 - 5 hrs | 8 | 17 |

Figure 18:
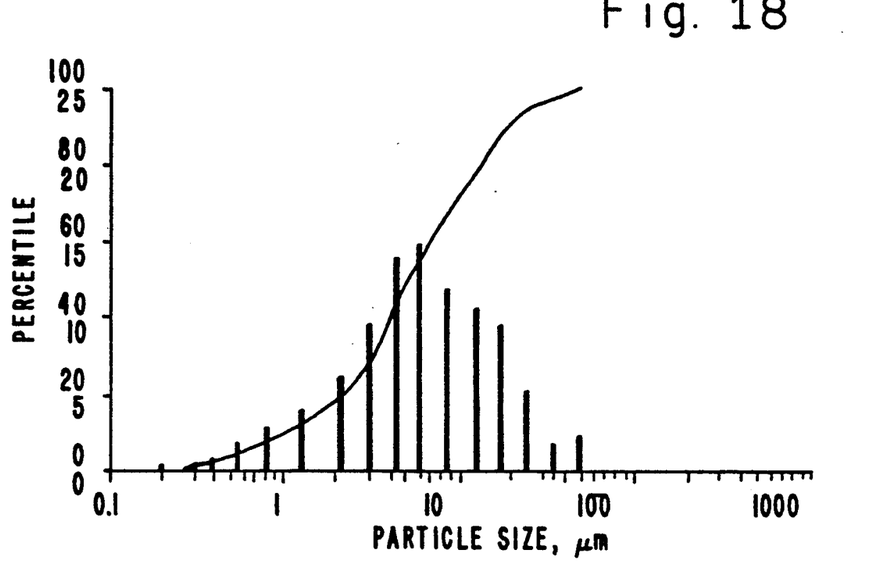
Figure 19:
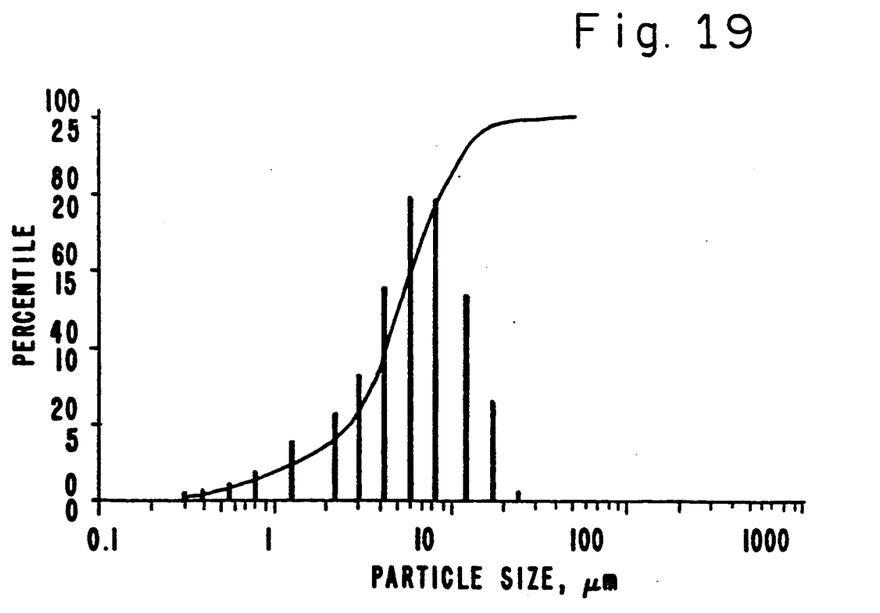

The particle size distribution for a phosphor having the preferred composition and prepared as described above is shown in FIGS. 18 and 19. FIG. 18 is for GGG, with 1.0% Cr activator. The average particle size was 6.31 μm, with 10% of the particles less than 1.32 μm and 10% of the particles greater than 21.15 μm. FIG. 19 is for YAG, with 0.5% Cr activator. The average particle size was 6.54 μm, with 10% of the particles less than 1.76 μm and 10% of the particles greater than 14.12 μm.

Thus, there has been disclosed a far-red emitting phosphor, consisting essentially of $Y_{3-y}Gd_yAl_{5-x}Ga_x-O_{12}$:A, where x ranges from 0 to 5, y ranges from 0 to 3, and A is selected from the group consisting of chromium, iron, vanadium, neodymium, dysprosium, cobalt, nickel, titanium or combination thereof. Various changes and modifications of an obvious nature will be readily apparent to those of ordinary skill in this art, and all such changes and modifications are considered to fall within the ambit of the invention, as defined by the appended claims.

What is claimed is:

1. In combination, a liquid crystal light valve including a photosensitive layer consisting essentially of hydrogened amorphous silicon and a cathode ray tube containing a far-red emitting phosphor operatively coupled thereto, characterized in that said phosphor consists essentially of $Y_{3-y}Gd_yAl_{5-x}Ga_x-O_{12}$:A, where x has a value within the range of from 0 to 5, y has a value within the range of from 0 to 3, and A is at least one of chromium and neodymium, where chromium has a value within the range of about 0.33 to 2 at% and neodymium has a value of about 1 at%.

2. The combination of claim 1, wherein A is chromium.

3. The combination of claim 1, wherein x=0 y=0, A is chromium.

4. The combination of claim 1, wherein x=5, y=3, A is chromium.

5. The combination of claim 1, wherein x=2, y=0, A is chromium.

* * * * *